Dec. 20, 1949  B. H. SMITH  2,492,011
MAXIMUM DEMAND ELECTRICAL MEASURING DEVICE
Filed Nov. 30, 1946
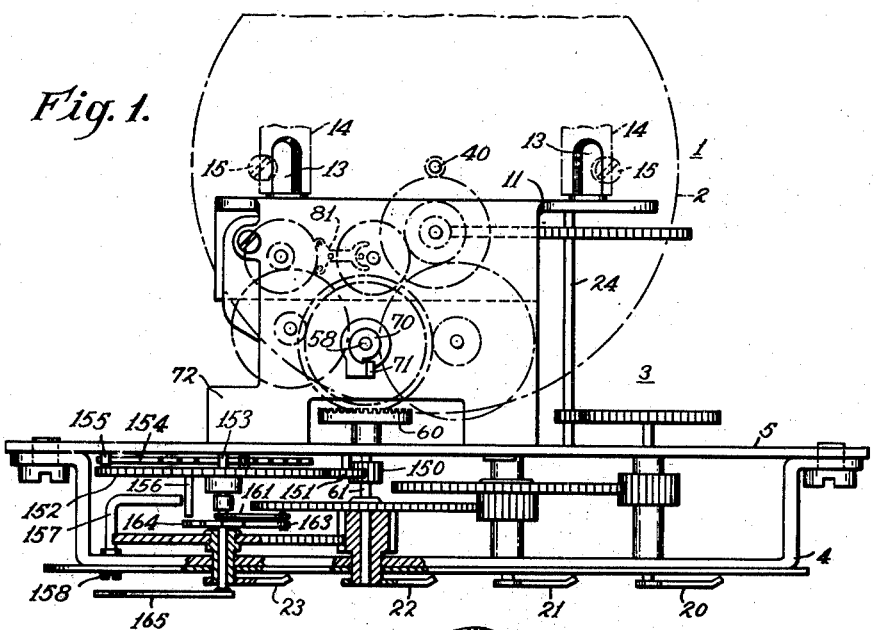
INVENTOR
Benjamin H. Smith.
BY
ATTORNEY Patented Dec. 20, 1949

2,492,011

UNITED STATES PATENT OFFICE 2,492,011

MAXIMUM DEMAND ELECTRICAL MEASURING DEVICE

Benjamin H. Smith, Bloomfield, N. J., assignor to Westinghouse Electric Corporation, East Pittsburgh, Pa., a corporation of Pennsylvania Application November 30, 1946, Serial No. 713,261

4 Claims. (Cl. 171—34)

This invention relates to measuring devices, and it has particular relation to measuring devices suitable for determining the number of times a variable quantity reaches or exceeds a predetermined value.

In analyzing the requirements of customers purchasing electrical energy, it is a well established practice to employ demand meters for measuring the maximum demand of each of the customers. Examples of such demand meters will be found in my Patents Nos. 2,003,016, 2,372,127 and in the Lewis et al. Patent 2,047,376. In a demand meter a pusher arm is employed for actuating a maximum demand pointer. The pusher arm is intended to actuate the maximum demand pointer to a value corresponding to the maximum demand for a predetermined duration such as 30 minutes, which occurred at any time during a meter reading interval, such as an interval of 1 month.

In order to analyze thoroughly the customer's requirements, it appears desirable that information be available which shows the number of times during a meter reading interval that the customer's requirements exceed a predetermined value or demand. Such information is not available from prior art indicating demand meters. It can be obtained from recording demand meters, but such meters are relatively costly and require the services of skilled personnel for installation and maintenance.

In accordance with the invention, a counting mechanism is provided which counts or determines the number of times the demand of a customer or consumer of a variable quantity, such as electrical energy, reaches or exceeds a predetermined value. To this end, an operating member is provided which is periodically actuated in accordance with the variable quantity. Movements of the operating member above a predetermined range of movement are counted for the purpose of obtaining desired information. In addition, adjustable means are provided for adjusting the value of the variable quantity which corresponds to each actuation of the counting mechanism. Provision also is made for preventing excessive movements of the operating member from unduly loading or damaging the associated mechanism.

It is therefore an object of the invention to provide a device for measuring or determining the number of times a variable quantity exceeds a predetermined value.

It is a further object of the invention to provide an electrical measuring device for measuring the number of times the demand for electrical energy during repetitive intervals reaches or exceeds a predetermined value.

Other objects of the invention will be apparent from the following description taken in conjunction with the accompanying drawing; in which:

Fig. 1 is a view in top plan with parts broken away of a measuring device embodying the invention;

Fig. 2 is a view in perspective with parts broken away of the measuring device shown in Fig. 1; and Fig. 3 is a fragmentary view in front elevation showing a portion of the dial and pointer assembly of the device shown in Fig. 1.

Referring to the drawing, Fig. 1 shows a measuring instrumentality 1 having a part actuated in accordance with a variable quantity to be measured. Although the instrumentality may vary appreciably in accordance with requirements, it will be assumed for the purpose of discussion that the instrumentality is an induction watthour meter represented by an armature disc 2.

The watthour meter has detachably associated therewith a register 3 which includes a supporting structure represented generally by a face plate 4, a base plate 5 and a wall 11. Conveniently, the register may be provided with a pair of spaced attaching pins 13 which are designed for reception in sockets 14 carried by the associated watthour meter. The pins may be secured in the sockets by suitable set screws 15.

Integrating pointers 20, 21, 22 and 23 are provided on the register 3 for the purpose of indicating the electrical energy to be measured by the watthour meter. These pointers are actuated in a manner well understood in the art through a shaft 24 which is coupled through suitable gearing to a pinion 40. The pinion 40 is rotated by the armature disc 2.

A gear 56 is coupled through suitable gearing to the pinion 40 for rotation in accordance with the rotation of the armature disc 2. The gear 56 is mounted on a shaft 58 which is pivotally mounted between plates 72 and 73. The gear 56 is rotatable relative to the shaft 58, and is coupled to a crown gear 60 for the purpose of rotating a shaft 61 in accordance with the rotation of the armature disc 2.

In order to actuate the shaft 61 in accordance with the demand occurring over repetitive demand intervals, the gear 56 is periodically uncoupled from the crown gear 60. Such operation is effected by rotation of the shaft 58 which carries a cam 70 periodically into engagement with a lug 71 secured to the supporting structure. Engagement of the lug 70 by the cam 71 rotates the plates 72 and 73 about the axis of a shaft 75 with respect to the supporting structure for the purpose of moving the gear 56 away from the crown gear 60. When the gear 60 is released from the gear 56, mechanism which will hereafter be described resets the crown gear to a predetermined base position.

The shaft is rotated at a uniform rate by operation of an escapement lever 81 and associated parts of an escapement mechanism to which the shaft 58 is coupled by a suitable gearing 90. The shaft 58 is attached to the inner end of a spiral spring 91 which has its outer end frictionally engaging a cylindrical surface of the gear 56. Rotation of the gear 56 stores energy in the spiral spring and rotates the shaft 58 at a rate controlled by the escapement mechanism. Consequently, at regular intervals which may be of the order of 30 minutes, the gears 56 and 60 are briefly separated.

The parts of the register 3 which thus far have been specifically described are similar to correspondingly numbered parts described in my Patent 2,372,127. Consequently, for a more detailed description of these parts and their operation, reference may be made to such patent.

Referring more particularly to Fig. 2, it will be noted that the shaft 61 carries a pinion 150. This pinion is coupled through an idler gear 151 to a gear 152 which may be terrmed "an operating member." The operating member 152 is mounted for rotation relative to a shaft 153 which is rotatably supported by the plates 4 and 5 of the register. The operating member is attached to the inner end of a spiral spring 154. The outer end of the spring 154 is secured to an abutment 155 which, in turn, is secured to the supporting structure of the register. The spring is utilized for urging a pusher pin 156 carried by the operating member in a clockwise direction as viewed in Fig. 2 towards a stop pin 157. This stop pin is adjustably secured in any suitable manner to the plate 4 as by a machine screw 158 which has its body projecting through a slot 159 (see Fig. 3) located in the face plate 4.

In response to rotation of the armature disc 2, the operating member 152 is rotated in a counter-clockwise direction as viewed in Fig. 2 until the gears 56 and 60 are separated by the operation of the cam 70. During the brief separation of the gears, the spiral spring 154 returns the operating member in a clockwise direction until the pusher pin 156 engages the stop pin 157. This operation is repeated in cycles as long as the armature 2 continues to rotate.

Rotation of the operating member 152 through a predetermined angle carries the pin 156 into engagement with a link 161 which has one end mounted on the shaft 153 for rotation relative thereto. A stop 162 determines the position of the link 161 prior to engagement thereof by the pin 156.

It will be noted that a pawl 163 is pivotally secured to the outer end of the link 161. This pawl engages the teeth of a ratchet wheel 164 for the purpose of advancing the rachet wheel by an angular distance about the axis of the shaft 153 corresponding to one tooth. Since the ratchet wheel 164 is secured to the shaft 153, rotation of the ratchet wheel also rotates the shaft 153 and a pointer 165 is secured to the shaft. By inspection of Fig. 3, it will be observed that the face plate 4 carries a scale 166 which cooperates with the pointer 165 to indicate the number of times the pointer has been notched or stepped by the pawl 163.

It is believed that the operation of the complete measuring device now may be set forth. It will be recalled that the shaft 61 is actuated during repetitive intervals in accordance with the rotation of the armature 2. At the start of one of these intervals, the pin 156 is in engagement with the associated stop pin 157. As the armature disc 2 rotates, the operating member 152 is rotated in a counterclockwise direction as viewed in Fig. 2 to carry the pin 156 towards the link 161. If the interval expires before the pin 156 reaches the link 161, the gears 56 and 60 separate and the spiral spring 154 returns the operating member 152 to its base position wherein the pin 156 engages the stop pin 157.

However, if the rate of consumption of electrical energy is such that the pin 156 is carried into engagement with the link 161 prior to the expiration of an interval, the pin 156 pushes the link 161 in a counterclockwise direction to advance the ratchet wheel 164 and the associated pointer 165 by an angular distance corresponding to one tooth of the ratchet wheel. Reverse rotation of the ratchet wheel may be prevented by detent represented by a spring 167 which has one end secured to an abutment 168. The abutment 168 positions the free ends of spring 167 to engage the teeth of the ratchet wheel and pevent reverse rotation thereof. The pointer 165 may be frictionally mounted on the shaft 153 for the purpose of permitting a resetting operation of the pointer at any desired interval, such as a one-month interval. Consequently, reading of the pointer 165 on its scale 166 represents the number of times the energy demand has been sufficient during the successive demand intervals to actuate the pusher pin 156 from its stop pin 157 into engagement with the link 161.

The amount of electrical energy represented by each notching operation of the pointer 165 may be adjusted by adjustment of the stop pin 157. It will be recalled that this stop pin may be adjusted by loosening the machine screw 158 to permit adjustment of the stop pin 157 relative to the slot 159. Such adjustment changes the angular displacement about the shaft 153 between the stop pin 157 and the link 161 and, consequently, changes the amount of energy required in any demand interval to move the pusher pin 156 from engagement with the stop pin 157 into engagement with the link 161.

The electrical energy consumed during a demand interval may be substantially greater than that required to drive the pusher pin 156 into engagement with the link 161. Under such circumstances the ratchet wheel and pawl mechanism may tend to stall the armature disc 2 and unduly load it. To prevent such loading, several teeth of the operating member 152 may be removed to provide a recess 170. This recess is so positioned that the recess receives the teeth of the gear 151 immediately after the pusher pin 156 has engaged the link 161 to notch the ratchet wheel forward. If the demand interval has not yet expired, continued rotation of the armature disc 2 results in the rotation of the gear 151 within the recess 170 and the armature disc 2 is not unduly loaded. At the expiration of the demand interval, the separation of the gears 56 and 60 permit a reset of the operating member 152.

Although the invention has been discussed with reference to certain specific embodiments thereof, numerous modifications are possible.

I claim as my invention:

1. In a device responsive to a variable quantity, a supporting structure, a stop member adjustably positioned on the supporting structure, an operating member, means mounting the operating member for rotation relative to the supporting structure about a predetermined axis, means for rotating the operating member relative to the supporting structure in accordance with said variable quantity, means for periodically resetting said operating member to a base position determined by the stop member, translating means for counting the number of times the operating member reaches a predetermined position angularly displaced about said axis from the base position, whereby adjustment of said stop member varies the value of the variable quantity required for actuating the translating means, and means adjustably mounting the stop member on the supporting structure for adjustment angularly about said axis to vary the value of the variable quantity required for actuating the translating means.

2. In a device responsive to a variable quantity, a supporting structure, an operating member, means including coupling gears for periodically moving said operating member relative to the supporting structure in accordance with the demand of a variable quantity during each of the periods of motion of said operating member, and translating means for counting the number of movements of said operating member which reach a value corresponding to a predetermined demand of the variable quantity, one of said gears having teeth omitted for uncoupling said gears if said operating member tends to move substantially beyond the range required for operation of the translating means.

3. In a device responsive to a variable quantity, a supporting structure, a stop member adjustably positioned on the supporting structure, an operating member, means mounting the operating member for rotation relative to the supporting structure about a predetermined axis, means including coupling gears for rotating the operating member relative to the supporting structure in accordance with said variable quantity, means for periodically resetting said operating member to a base position determined by the stop member, and translating means for counting the number of times the operating member reaches a predetermined position, angularly displaced about said axis from the base position, whereby adjustment of said stop member varies the value of the variable quantity required for actuating the translating means, one of said gears having teeth omitted for uncoupling the gears in response to movement of the operating member beyond said predetermined position.

4. In an electrical meter assembly, an integrating electrical meter for measuring a variable quantity, said integrating electrical meter comprising a stator structure and a rotor structure disposed for rotation relative to the stator structure in accordance with the quantity to be measured, and a register detachably secured to said stator structure for operation by said rotor structure said register comprising a supporting structure, an operating member, means coupling the rotor structure to said operating member for rotating the operating member relative to the supporting structure in accordance with rotation of the rotor structure, a stop member adjustably positioned on said supporting structure, means for periodically resetting the operating member to an adjustable base position determined by said stop member, and means for counting the number of times the operating member reaches a predetermined position angularly displaced about said axis from the base position, said coupling means including a pair of meshing gears, one of said gears having teeth removed to prevent actuation of the operating member thereby substantially beyond said predetermined position.

BENJAMIN H. SMITH.

REFERENCES CITED

The following references are of record in the file of this patent:

UNITED STATES PATENTS

| Number | Name | Date |
| --- | --- | --- |
| 725,708 | Holden | Apr. 21, 1903 |
| 2,145,069 | Beusch et al. | Jan. 24, 1939 |